July 12, 1955

F. T. ROLLER 2,712,741

DEVICE FOR ARTICULATED JOINING OF SHAFTS

Filed Nov. 27, 1951

Inventor
Franz Th. Roller
By Austin, Nicke, Wilhelm & Padlow
Attorneys ated July 12, 1955

2,712,741
DEVICE FOR ARTICULATED JOINING OF SHAFTS

Franz T. Roller, Stuttgart, Germany, assignor to Daimler-Benz Aktiengesellschaft, Stuttgart-Unterturkheim, Germany Application November 27, 1951, Serial No. 258,316

Claims priority, application Germany November 28, 1950

1 Claim. (Cl. 64—13)

This invention relates to a device for articulated joining of shafts, and more particularly to such a device in which both shafts are aligned within each other by a ball-and-socket joint.

An object of the present invention is to provide a device of the character mentioned which secures the advantages of diminished strains upon the ball engagement and a longer useful life of the co-operating ball-and-socket parts.

Another object of the present invention is to provide a device of the character mentioned in which any wear of the co-operating ball-and-socket parts is readily compensated for and also secures the accurate engagement of such parts at all times.

A further object of the present invention is to provide a device of the character mentioned permitting a relative displaceability of the two shafts coupled together by means of the ball-and-socket joint.

A still further object of the present invention is to provide a device of the character mentioned that includes effective means for forming a seal with the parts which are supported within one another.

Figure 1:
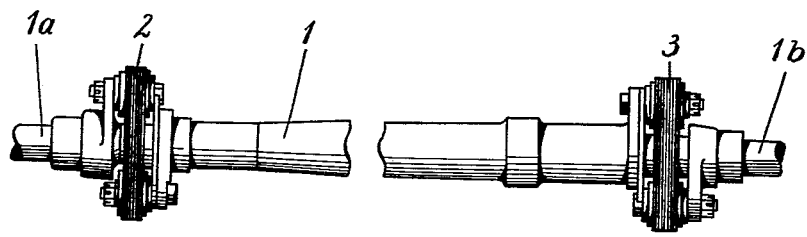
Figure 2:
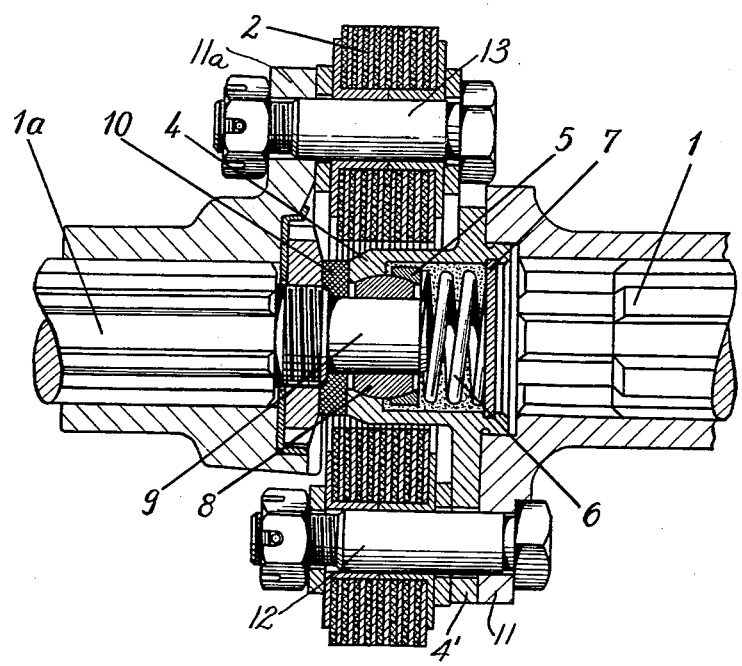

The various objects and features of the present invention will be fully understood from the following detailed description of a typical preferred form and application of the invention, throughout which description reference is made to the accompanying drawing, in which:

Fig. 1 is a side view of a Cardan shaft of a motor vehicle with two alignment points, Fig. 2 is a longitudinal section through one of the alignment points according to Fig. 1 on a larger scale.

In the construction shown in the drawing, the Cardan shaft 1 is arranged between two flexible disks 2 and 3. The shaft 1 is to be aligned with the adjoining shafts 1a and 1b. To this end the hub of one of the elastic disk flanges 4' is provided with an extension which at its end 4 forms one half of a ball socket. This disc flange 4', which forms with the extension 4 thereof one-half of the ball socket, is also connected with the disc flange 11 of shaft 1 by means of bolt 12 which at the same time connects the flange 11 with the flexible discs 2. The other half of the ball socket is formed by a spring seat 5 which supports one end of a compression spring 6 also accommodated within the hub. The other end of said spring is supported upon a disk 7 arranged in the hub. An alignment ball 8 is disposed between the two socket halves 4 and 5. This ball 8 has a center bore and is rotatably and slidably supported upon a pin 9 at the end of the associated shaft 1a. Also arranged upon the pin 9 is an elastic sealing disk 10. The disk 7 also serves as a sealing disk and the entire space within these two sealing disks 7 and 10 is filled up with lubricant, particularly grease. The shaft 1a is also provided with a disc flange 11a which is also connected with flexible discs 2 by means of bolt 13 so that circular torque may be transmitted while simultaneously providing a self-aligning coupling which is self-adjusting and hermetically sealed.

The ball-and-socket support exerts an aligning action upon the ends of the shafts 1, 1a and 1, 1b. Since there is surface contact on the ball pin, wear is therefore diminished, and the same is always compensated for by the adjusting action of the spring 6.

What is claimed is:

Apparatus for connecting together two shafts, comprising a flange part on the end of one of said shafts, a flange part on the end of the other of said shafts, elastic means for connecting said two flange parts with one another to transmit a torque upon angular displacement of the shafts with respect to each other, a center pin on the end of said one shaft within said elastic means, a ball slidable on said center pin, a sleeve-shaped part on the flange part of said other shaft, said sleeve-shaped part lying within said elastic means and surrounding said center pin with one end thereof, an inwardly-directed flange portion on the last-mentioned end of said sleeve-shaped part, an end sealing member in the other end of said sleeve-shaped part in sealing engagement therewith, said inwardly-directed flange portion being formed as a fixed spherically-shaped bearing portion, a movable spherically-shaped bearing portion between said inwardly-directed flange portion and said end member, said ball being located between said spherically-shaped bearing portions within said sleeve-shaped part, a spring within said sleeve-shaped part abutting at one end thereof against said end member and at the other end thereof against said movable bearing portion, whereby said spring urges said movable bearing portion against said ball, and a sealing member located between said inwardly-directed flange portion and said center pin.

References Cited in the file of this patent

UNITED STATES PATENTS

| | | |
|---|---|---|
| 1,355,516 | Stahl | Oct. 12, 1920 |
| 1,550,458 | Schell | Aug. 18, 1925 |
| 1,829,964 | Randall | Nov. 3, 1931 |
| 2,200,643 | Smith | May 14, 1940 |